March 4, 1947.  M. E. CHANDLER  2,416,907
CARBURETOR
Filed Sept. 14, 1943
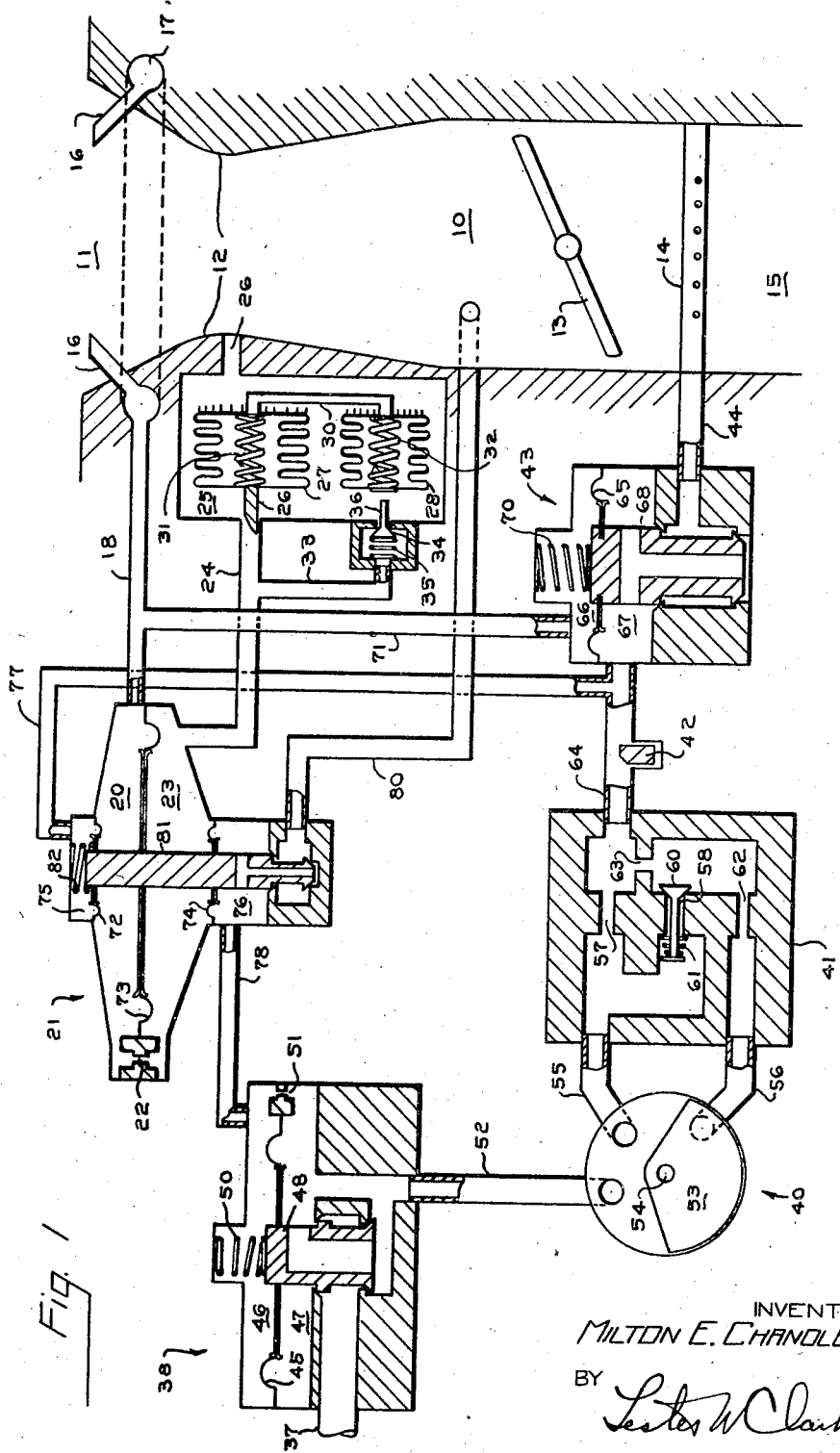
INVENTOR
MILTON E. CHANDLER
BY
Lester W Clark
AGENT Patented Mar. 4, 1947

2,416,907

UNITED STATES PATENT OFFICE 2,416,907

CARBURETOR

Milton E. Chandler, New Britain, Conn., assignor, by mesne assignments, to Niles-Bement-Pond Company, West Hartford, Conn., a corporation of New Jersey Application September 14, 1943, Serial No. 502,266

5 Claims. (Cl. 261—69)

The present invention relates to carburetors for use with internal combustion engines on aircraft.

In certain types of aircraft carburetors it is customary to measure the quantity of air entering the engine and to control the quantity of fuel supplied to the engine in accordance with the quantity of air so as to maintain a fuel to air ratio which provides predetermined combustion conditions in the engine. The usual method of measuring the air flow is to utilize a Venturi meter. Meters of this type measure the velocity of the flowing air, and are therefore subject to error when the density of the air changes. When such a meter is used on an aircraft, the variation in air density with altitude must be considered in the design of the carburetor, and some means must be provided to compensate for it.

One of the most effective types of altitude compensating arrangements involves the use of a sealed flexible bellows exposed to atmospheric pressure which expands and contracts in accordance with the difference between the internal and external pressures acting on it. Such a bellows may be used to operate a valve or other controlling member to produce a compensating effect either in the air meter or in the fuel flow control mechanism.

Such bellows may be evacuated substantially completely, or they may be filled with fluid. Fluid filled bellows may be classified in three types:

(1) Bellows filled with fluid at less than atmospheric pressure, commonly called "vacuum-filled" bellows, so that when normal atmospheric pressure conditions exist outside the bellows, it is stressed in a sense tending to cause contraction of the bellows;

(2) Bellows filled with fluid at substantially normal atmospheric pressure, commonly called "atmospheric-filled" bellows, so that when normal pressure exists outside the bellows, it is unstressed; and (3) Bellows filled with fluid under a pressure greater than atmospheric, commonly called "pressure-filled" bellows, so that when normal atmospheric pressures exist outside the bellows, the bellows is stressed in a direction tending to expand it.

The fluid with which such a bellows is filled may be chosen to have a suitable temperature coefficient of expansion so that the bellows responds to variations in temperature of the surrounding air as well as to variations in pressure.

A bellows of this type is a relatively delicate structure, and when used on an aircraft where it is subject to considerable vibration, it has been found that leakage of the bellows may occur despite all possible precautions. When such a leak occurs, the internal and external pressures acting on the bellows are equalized. Therefore a bellows filled with fluid under less than atmospheric pressure expands when it leaks whereas a bellows filled with fluid under greater than atmospheric pressure contracts when it leaks. A bellows filled with fluid at normal atmospheric pressure, on the other hand, tends to return to its normal position when it leaks regardless of existing external pressure.

When such a bellows is used to compensate for altitude on an aircraft carburetor, it is essential that the bellows be so arranged, that it will not tend to cause a leaning out of the fuel and air mixture when the bellows leaks. If the fuel and air mixture is made too lean, the motor tends to overheat, with consequent damage to the motor. It is therefore usual to provide a bellows of the type filled with fluid at normal atmospheric pressure for use in compensating the action of an aircraft carburetor for altitude variations.

Since with vacuum filled bellows a wider range of temperature and pressure response characteristics are available than with the atmospheric filled type, it is desired to use bellows of the vacuum-filled type in aircraft carburetors.

It is therefore an object of the present invention to provide an altitude compensating arrangement for an aircraft carburetor wherein a bellows filled with fluid at a pressure different from atmospheric is used, and wherein means is provided to insure that upon leakage of the bellows, the fuel and air mixture supplied to the engine is made richer, rather than leaner.

Another object is to provide an arrangement including a flexible bellows for compensating the action of an aircraft carburetor for changes in altitude and further including means to insure that upon failure of the bellows the altitude compensating means is rendered inoperative in a safe sense.

Another object is to provide fluid flow control apparatus including a vacuum filled bellows and valve means operated thereby in a closing direction upon expansion of said bellows, and means whereby upon abnormal expansion of said bellows, the valve means is opened.

Other objects and advantages of the present invention will become apparent from a consideration of the appended specification, claims and drawing, in which the single figure is a somewhat diagrammatic illustration of an aircraft carburetor including a vacuum filled bellows for altitude compensation purposes and embodying the principles of my invention.

10 for air flowing thru an aircraft carburetor. Air enters the passage 10 at an inlet 11, and flows past a Venturi restriction 12, a throttle 13 and a discharge nozzle 14 to an outlet 15.

A second air passage connects the inlet 11 and the throat of the Venturi restriction 12. This second passage may be traced from the inlet 11 thru a plurality of impact tubes 16, a passage 17 interconnecting the impact tubes and commonly termed a vent ring, a conduit 18, an expansible chamber 20 in a pressure meter 21, a restriction 22, another expansible chamber 23 in the pressure meter 21, a conduit 24, a chamber 25 and a conduit 26 to the throat of Venturi restriction 12.

The flow of air from conduit 24 into chamber 25 is controlled by a valve 26 which is mounted on the free end of a flexible bellows 27, whose opposite end is fixed inside the chamber 25. Another bellows 28 is mounted in the chamber 25, and the interiors of the two bellows are connected thru a conduit 30. The bellows 27 and 28 are filled with an expansible fluid at a pressure less than atmospheric, so that when the pressure in the chamber 25 is at the normal atmospheric value, the bellows 27 and 28 tend to collapse. If the bellows themselves are not sufficiently strong to prevent such collapse, they may be provided with internal springs such as the springs 31 and 32 illustrated in the drawing.

The total pressure drop between the inlet 11 and the throat of the venturi 12 may be separated into two components, one appearing across restriction 22 and the other across valve 26. As the altitude of the aircraft increases, the bellows 27 and 28 expand. Expansion of bellows 27 moves valve 26 in a closing direction thereby restricting the flow of air thru the second passage previously traced. As the valve 26 is moved toward closed position with increasing altitude, a greater proportion of the total pressure drop takes place across valve 26 and a smaller proportion across restriction 22. It is this pressure drop across restriction 22 which is effective in the pressure meter 21 as a measure of the mass of the flowing air. The function of bellows 27 and valve 26 is to maintain a pressure differential between chambers 20 and 23 of pressure meter 21 which is substantially a true indication of the mass of air flowing thru the passage 10.

Since the pressure differential produced by a Venturi restriction varies with the velocity of the air, it may be seen that, for a constant mass of air flowing per unit time, a decrease in density of the air causes the venturi to create a higher differential pressure. In order to secure a differential pressure which is an accurate measure of the mass of air flowing, the bellows operated valve 26 is provided, and it responds to a decrease in air density so as to reduce the proportion of the total pressure drop between the inlet 11 and the throat of Venturi restriction 12 which is used as a measure of the mass of the flowing air in the pressure meter 21.

If the bellows 27 leaks, its internal and external pressures become equalized, and it expands, closing the valve 26 completely. This would result in the absence of any pressure drop across restriction 22, and the pressure meter 21 could no longer operate in accordance with the mass of the flowing air, unless means were provided to prevent such action.

I have, however, provided means to prevent the occurrence of such a condition. A conduit 33 leads from the conduit 24 and thru an opening controlled by a valve 34, biased to closed position by a spring 35, into the chamber 25. A projection 36 on the valve 34 extends into the path of movement of the free end of bellows 28 in the chamber 25. It may be seen that upon expansion of bellows 27 and 28 such as accompanies a leakage of either bellows, the projection 36 is engaged by the free end of bellows 28, and the valve 34 is thereby opened against the force of spring 35. Under such conditions, the pressure drop appearing across restriction 22 is a fixed proportion of the total pressure drop between the inlet 11 and the throat of venturi 12, depending upon the relative proportions of restriction 22 and the opening controlled by the valve 34. These openings may be so designed as to produce any desired fuel to air ratio under sea level conditions. If the fuel to air ratio is sufficiently rich under sea level conditions, the mixture will become increasingly rich with altitude, so that altho the altitude compensation arrangement is inoperative it fails in a safe sense, in that the mixture is always richer than necessary.

The bellows 28 and spring 32 should be so designed that the combination has a relatively high spring rate as compared to that of bellows 27 and spring 31, so that the motion of the free end of bellows 28 with changes in external pressure is small compared to the motion of the free end of bellows 27. Undesired interference between projection 36 and the end of bellows 28 is thus prevented.

The fuel flowing thru the carburetor of Figure 1 comes from a pump or other source of fuel under pressure (not shown). From this source, the fuel flows thru a conduit 37, a fuel regulator valve 38, a mixture control unit 40, a jet system 41, past an idle valve 42, and thru a pressure regulator 43 and a conduit 44 to the discharge nozzle 14.

The fuel regulator 38 includes a casing divided by a flexible diaphragm 45 into a pair of expansible chambers 46 and 47. The diaphragm 45 carries at its center a valve 48, which is balanced against inlet pressure, and is biased toward open position by a spring 50. A restriction 51 interconnects the chambers 46 and 47. The pressure in chamber 47 is the pressure at the outlet of the valve 48, while the pressure in chamber 46 is controlled by the pressure meter 21 in a manner to be hereinafter described.

A conduit 52 conducts fuel from the fuel regulator 38 to the mixture control unit 40. The mixture control unit 40 includes a disc valve 53 rotatable by means of a shaft 54 to open and close ports connected to conduit 52 and to a pair of conduits 55 and 56 extending to the jet system 41. When the disc valve member 53 is in the position shown in the drawing, fuel may enter the jet system 41 only thru the conduit 55. The mixture control valve is then said to be in its lean position. If the mixture control valve is rotated so that both the conduits 55 and 56 are open, the mixture control valve is said to be in its rich position. If the valve 53 is rotated so that both conduits 55 and 56 are closed, the mixture control is said to be in its cut-off position.

Fuel entering the jet system 41 thru the conduit 55 may flow either thru a fixed restriction or jet 57 or thru a restriction or jet 58 controlled by a poppet valve 60 biased to closed position by means of a spring 61. Fuel entering the jet system 41 thru the conduit 56 flows thru a fixed restriction 62. Fuel flowing thru the restrictions 58 and 62 passes thru an additional limiting restriction 63 before passing out of the jet system thru a conduit 64.

The pressure regulator 43 includes a casing divided by a flexible diaphragm 65 into a pair of expansible chambers 66 and 67. The diaphragm 65 carries at its center a valve 68, which is biased toward closed position by a spring 70. Altho the valve 68 is illustrated as being balanced against outlet pressure, it is not necessary that a balanced valve be used when the fuel flow is controlled by a pressure meter such as that indicated at 21, as explained hereinafter. The chamber 66 is connected thru a conduit 71 and the conduit 18, vent ring 17 and the impact tubes 16 to atmospheric pressure at the inlet 11. This connection is merely to permit free movement of the diaphragm 65 without compressing the fluid in the chamber 66. Since the chamber 66 is supplied with air at atmospheric pressure, the spring 70 acts to maintain a pressure greater than atmospheric in the chamber 67. The fuel supplied to the discharge nozzle 14 is therefore always under pressure and any tendency of the fuel to vaporize in the conduit 44 or in the nozzle 14 is minimized.

The pressure meter 21 includes a casing divided by three flexible diaphragms 72, 73 and 74 into four expansible chambers 75, 20, 23 and 76. The connections of chambers 20 and 23 have already been described. The chamber 75 is connected thru a conduit 77 to the conduit 64 in the fuel line downstream from the jet system 41. The chamber 76 is connected thru a conduit 78 to the chamber 46 in the fuel regulator 38.

A portion of the fuel entering chamber 47 of the fuel regulator 38 passes thru restriction 51, chamber 46, conduit 78, chamber 76 of pressure meter 21, and thru a conduit 80 to a drain in the air passage 10.

The pressure meter 21 also includes a valve member 81 attached to the diaphragms 72, 73, and 74, and biased to closed position by a spring 82. The valve 81 controls the pressure in chamber 76 and hence the pressure in chamber 46 of fuel regulator 38.

It may be seen that upon an increase in the quantity of air flowing thru the passage 10, the pressure differential between chambers 20 and 23 is increased, thereby moving the valve 81 in a closing direction and increasing the pressure in chamber 76. The closing movement of valve 81 continues until the pressure in chamber 76 has increased sufficiently to balance the increase in the force acting on diaphragm 73 due to the increased air pressure differential.

The increased pressure in chamber 76 is transmitted to chamber 46 of the fuel regulator 38, where it acts on diaphragm 45 in a direction to open the valve 48 and increase the flow of fuel to the carburetor so as to maintain the desired fuel to air ratio.

The quantity of fuel entering the carburetor is determined by the pressure differential across the jet system 41. The pressure upstream from the jet system is regulated by the fuel regulator 38 in accordance with the quantity of air entering the carburetor, in the manner just described. If the pressure downstream from the jet system 41 varies, that variation is communicated thru conduit 77 to the chamber 75 in pressure meter 21, where it acts on the valve 81 in a direction to produce a balancing change in the pressure upstream from the jet system 41. For example, if the pressure downstream from the jet system decreases for any reason, the decrease in pressure is communicated to chamber 75, causing an opening movement of valve 81, thereby decreasing the pressure in chamber 76 of pressure meter 21 and in chamber 46 of fuel regulator 38, thereby causing a closing movement of valve 81 and a decrease in pressure upstream from the jet system 41.

The spring loaded valve 60 controlling the fuel flow thru restriction 58 is provided to increase the fuel and air ratio whenever the pressure differential across the jet system exceeds a value determined by the strength of spring 61. This increase in the fuel to air ratio causes the engine to run on a rich mixture whenever high power output is required of the engine.

When the throttle 13 is at closed or nearly closed positions, the quantity of air flowing thru the Venturi restriction 12 is so small in proportion to its cross-sectional area that the pressure differential produced in the chambers 20 and 23 of the pressure meter 21 is no longer an accurate measure of the quantity of air entering the engine. Under such circumstances, the spring 82 acting on the valve 81 and the spring 50 acting on valve 48 are effective to operate their respective valves in a direction to increase the flow of fuel to the engine. In effect, the fuel regulator 38 is thereby operated to maintain a fuel supply more than sufficient to produce proper operation of the engine. At the same time, the idle valve 42, which is connected to the throttle 13 by a linkage not shown, comes into operation to restrict the fuel flow in accordance with the throttle position. At normal open throttle positions, the idle valve 42 is retracted so that it does not restrict the fuel flow. When the throttle position is such that the pressure meter 21 is no longer accurate, the idle valve 42 is moved to restrict the fuel flow. In effect, the control of the fuel flow is transferred from the pressure meter 21 to the idle valve 42 at low air flows.

I claim as my invention:

1. In a carburetor for an internal combustion engine, in combination, a first conduit for air flowing to said engine for combustion purposes, means associated with said first conduit for producing two unequal pressures whose difference is a function of the velocity of the air flowing therethru, a second conduit in which a flow of air is produced by said unequal pressures, a fixed restriction in said second conduit, a pair of valves connected in parallel in said second conduit, spring means biasing one of said valves to closed position, means including a first flexible bellows for operating the other of said valves so as to produce across said fixed restriction a pressure differential substantially proportional to the mass of air flowing thru said first conduit, said flexible bellows having its exterior exposed to a pressure varying in accordance with atmospheric pressure and containing an expansible fluid at a pressure substantially less than said exterior pressure so that the difference between said exterior and interior pressures tends to contract said bellows and open said other valve, a second bellows having its interior connected to the interior of said first bellows and normally spaced from said one valve, but effective upon expansion such as accompanies bellows leakage to engage and open said one valve against said biasing means, and means responsive to the pressure differential across said fixed restriction for controlling the flow of fuel to said engine.

2. In a carburetor for an internal combustion engine, in combination, a first conduit for air flowing to said engine for combustion purposes, means associated with said first conduit for producing two unequal pressures whose difference is a function of the velocity of the air flowing therethru, a second conduit in which a flow of air is produced by said unequal pressures, a fixed restriction in said second conduit, a pair of valves connected in parallel in said second conduit, spring means biasing one of said valves to closed position, means including a first flexible bellows for operating the other of said valves so as to produce across said fixed restriction a pressure differential substantially proportional to the mass of air flowing thru said first conduit, said flexible bellows having its exterior exposed to a pressure varying in accordance with atmospheric pressure and containing an expansible fluid at a pressure substantially less than said exterior pressure so that the difference between said exterior and interior pressures tends to contract said bellows and open said other valve, first spring means associated with said bellows and acting in a closing direction on said other valve, said spring means being effective upon leakage of said bellows to close said other valve, a second bellows having its interior connected to the interior of said first bellows and aligned with but normally spaced from said one valve, second spring means associated with said second bellows and having a rate sufficiently high to limit the travel of said second bellows under normal conditions so that said one valve is not engaged by said second bellows, said second bellows being effective upon expansion such as accompanies bellows leakage to engage and open said one valve against its associated biasing means, and means responsive to the pressure differential across said fixed restriction for controlling the flow of fuel to said engine.

3. In a carburetor for an internal combustion engine, an air conduit, means responsive to the rate of flow of air thru said conduit for controlling the flow of fuel to said engine, and means for varying the flow of air thru said conduit to correct the fuel flow for variations in air density, said last-named means comprising a pair of valves connected in parallel in said conduit, spring means biasing one of said valves to closed position, means including a first flexible bellows for operating the other of said valves, said flexible bellows having its exterior exposed to a fluid under pressure varying in accordance with atmospheric pressure and containing an expansible fluid at a pressure substantially less than said exterior pressure so that a decrease in the difference between said exterior and interior pressures tends to expand said bellows and close said other valve, and a second bellows having its interior connected to the interior of said first bellows and aligned with but normally spaced from said one valve, but effective upon expansion such as accompanies bellows leakage to engage and open said one valve against said biasing means.

4. In a carburetor for an internal combustion engine, an air conduit, means responsive to the rate of flow of air thru said conduit for controlling the flow of fuel to said engine, and means for varying the flow of air thru said conduit to correct the fuel flow for variations in air density, said last-named means comprising a pair of valves connected in parallel in said conduit, spring means biasing one of said valves to closed position, means including a first flexible bellows for operating the other of said valves, said flexible bellows having its exterior exposed to a fluid under pressure varying in accordance with atmospheric pressure and containing an expansible fluid at a pressure substantially less than said exterior pressure so that a decrease in the difference between said exterior and interior pressures tends to expand said bellows and close said other valve, first spring means associated with said bellows and acting in a closing direction on said other valve, said spring means being effective upon leakage of said bellows to close said other valve, a second bellows having its interior connected to the interior of said first bellows and aligned with but normally spaced from said one valve, and second spring means associated with said second bellows and having a rate sufficiently high to limit the travel of said second bellows under normal conditions so that said one valve is not engaged by said second bellows, said second bellows being effective upon expansion such as accompanies bellows leakage to engage and open said one valve against its associated biasing means.

5. In a carburetor for an internal combustion engine, in combination, a first conduit for air flowing to said engine for combustion purposes, means associated with said first conduit for producing two unequal pressures whose difference is a function of the velocity of the air flowing therethru, a second conduit in which a flow of air is produced by said unequal pressures, a fixed restriction in said second conduit, a pair of valves connected in parallel in said second conduit, spring means biasing one of said valves to closed position, means including a flexible bellows for operating the other of said valves so as to produce across said fixed restriction a pressure differential substantially proportional to the mass of air flowing thru said first conduit, said flexible bellows having its exterior exposed to a fluid under pressure varying in accordance with atmospheric pressure and containing an expansible fluid at a pressure substantially less than said exterior pressure so that a decrease in the difference between said exterior and interior pressures tends to expand said bellows and close said other valve, means for opening said one valve against said biasing means including a member associated with said bellows for concurrent movement therewith and normally spaced from said one valve to permit independent movement of said member and said one valve during the normal range of movement of said bellows but effective upon extreme expansion of said bellows such as accompanies bellows leakage to engage and open said one valve against said biasing means, and means responsive to the pressure differential across said fixed restriction for controlling the flow of fuel to said engine.

MILTON E. CHANDLER.

REFERENCES CITED

The following references are of record in the file of this patent:

UNITED STATES PATENTS

| Number | Name | Date |
|---|---|---|
| 2,224,472 | Chandler | Dec. 10, 1940 |
| 2,250,932 | Kittler | July 29, 1941 |
| 2,223,381 | Mock | Dec. 3, 1940 |
| 2,155,950 | Nallinger | Apr. 25, 1939 |

FOREIGN PATENTS

| Number | Country | Date |
|---|---|---|
| 842,862 | French | June 21, 1939 |
| 523,895 | British | July 25, 1940 |